United States Patent [19]

Sharp

[11] Patent Number: 4,668,130

[45] Date of Patent: May 26, 1987

[54] DENSE PHASE COAL FEEDING SYSTEM

[75] Inventor: David W. Sharp, Houston, Tex.

[73] Assignee: Exxon Research and Engineering Company, Florham Park, N.J.

[21] Appl. No.: 365,733

[22] Filed: Apr. 5, 1982

[51] Int. Cl.$^4$ .............................................. B65G 53/48
[52] U.S. Cl. ...................................... 406/14; 406/53; 406/56; 414/218; 15/104.1 R
[58] Field of Search ........................ 406/14, 53, 56, 63, 406/65, 68, 146, 191; 414/217, 218, 219; 198/659; 15/104.09, 104.1 R; 48/86 R, 197 R

[56] References Cited

U.S. PATENT DOCUMENTS

| | | | |
|---|---|---|---|
| 351,014 | 10/1886 | Wissler | 198/659 |
| 902,315 | 10/1908 | McCarty | 15/104.1 R |
| 1,454,979 | 5/1923 | Muhlfeld et al. | |
| 2,304,827 | 12/1942 | Jewell | 406/56 X |
| 3,159,432 | 12/1964 | Ostrowski et al. | 406/14 |
| 3,669,502 | 5/1972 | Leman | |
| 3,775,071 | 11/1973 | Hoffert et al. | |
| 4,017,269 | 4/1977 | Dutz et al. | 406/14 X |
| 4,019,641 | 4/1977 | Merz | |
| 4,030,642 | 6/1977 | Morrison | 406/65 X |
| 4,244,705 | 1/1981 | Seidl et al. | |

Primary Examiner—Jeffrey V. Nase
Attorney, Agent, or Firm—Wayne Hoover

[57] ABSTRACT

Carbonaceous solids such as coal and oil shale are fed to a high temperature processing vessel without bridging and plugging problems interrupting the flow of the solids into the processing vessel by passing the solids at a controlled rate from a feed vessel into a first conduit communicating with the feed vessel. The solids are then passed through the first conduit into a second conduit which communicates with the first conduit and the processing vessel, and which contains a scraper for scraping the inside walls of the conduit. The pressure in the feed vessel is maintained at a level higher than that in the processing vessel by passing a sufficient amount of a gas into the feed vessel such that the solids are passed through the second conduit into the processing vessel in dense phase pneumatic flow as the scraper scrapes the inside walls of the second conduit thereby preventing any bridging or plugging from occurring. Normally, the scraper will consist of a wire helix which is rotated inside the second conduit.

14 Claims, 1 Drawing Figure

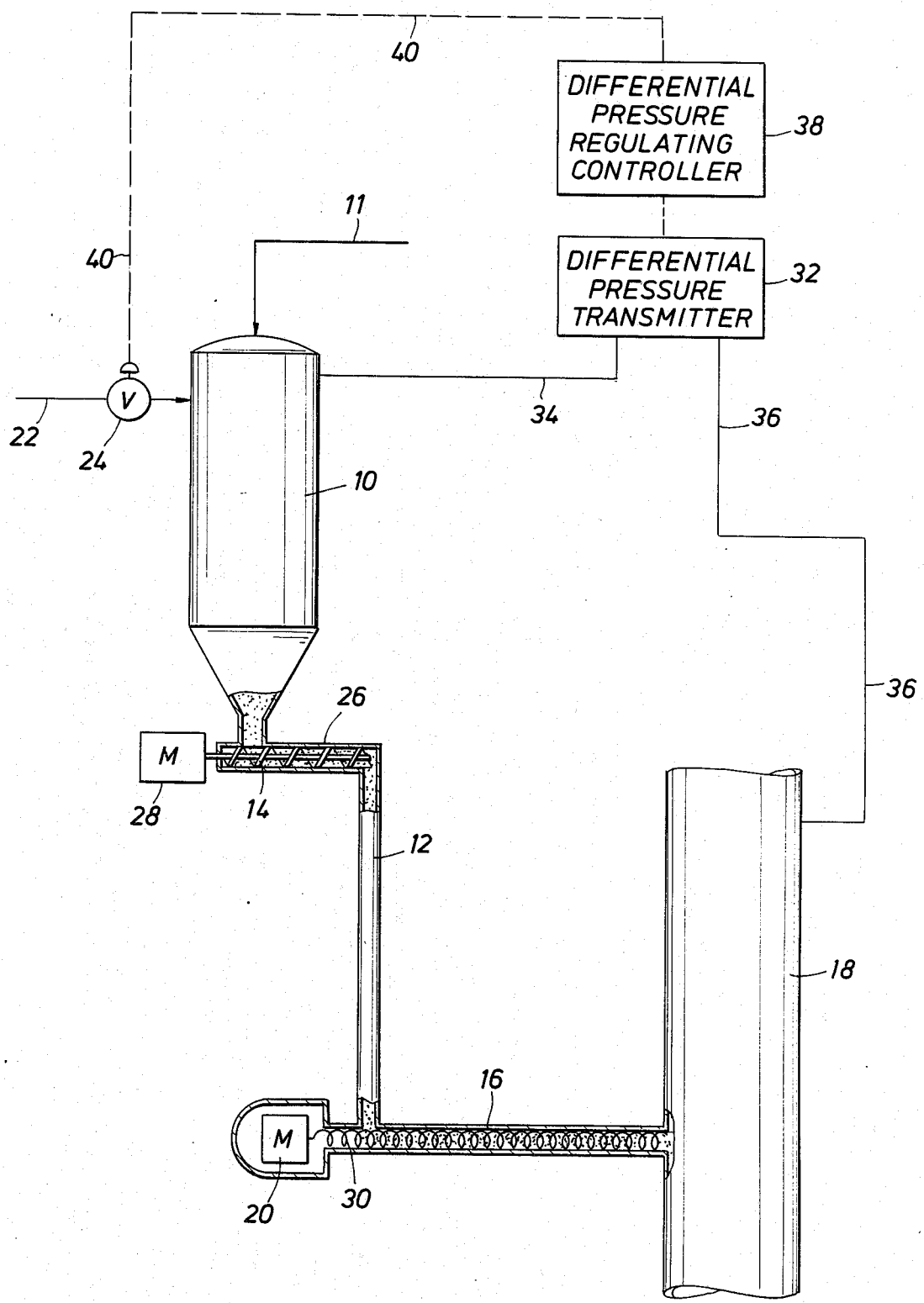

DENSE PHASE COAL FEEDING SYSTEM

BACKGROUND OF THE INVENTION

This invention relates to a process and apparatus for pneumatically conveying particulate material from one location to another and is particularly concerned with a process and apparatus for feeding coal, oil shale and similar carbonaceous solids which tend to agglomerate and/or swell to a processing vessel operated at an elevated temperature.

Pneumatic conveying systems are utilized widely throughout industry for transporting particulate materials from one place to another. For example, industrial pneumatic conveying systems are used to transport flour, seeds, grains, and powdered bulk materials in enclosed pipeline systems from one portion of a processing plant to another. Pneumatic conveying can also be used to pass such particulate solids from storage vessels into reactors operated at high pressures and temperatures. However, the application of such pneumatic conveying techniques to transport coal, oil shale and other carbonaceous solids containing volatilizable hydrocarbons from storage facilities into reactors or other processing vessels operated at elevated temperatures has generally been unsuccessful. As the carbonaceous solids flow through a conveying tube to the reactor, the temperature to which they are subjected increases rather rapidly causing the solids to swell and become sticky. This, in turn, normally leads to the formation of agglomerates in the tube which ultimately results in bridging of the feed solids and interruption of the normal flow of feed to the reaction vessel. In severe cases, large agglomerates form and block the entire feed line thereby resulting in a complete shut-down of the process.

SUMMARY OF THE INVENTION

The present invention provides an improved process and apparatus for feeding carbonaceous solids that tend to agglomerate and/or swell at elevated temperatures to a processing vessel operated at an elevated temperature which at least in part alleviates the difficulties described above. In accordance with the invention, it has now been found that bridging and plugging problems associated with conventional dense phase pneumatic conveying systems can be avoided when feeding carbonaceous solids that tend to agglomerate and/or swell into a high temperature processing vessel with the apparatus of this invention by passing the carbonaceous solids at a controlled rate from a feed vessel into a first conduit communicating with the feed vessel. The carbonaceous solids are passed through the first conduit into a second conduit which communicates with the first conduit and with the high temperature processing vessel, and which contains means for scraping the inside walls of the conduit. The pressure in the feed vessel is controlled such that the carbonaceous solids pass through the second conduit in dense phase pneumatic flow into the processing vessel as the scraping means scrapes the inside walls of the second conduit. The pressure in the feed vessel is controlled by passing a gas into the feed vessel such that the pressure in the feed vessel is higher than the pressure in the processing vessel. The scraping means does not normally contribute to the movement of the carbonaceous solids through the second conduit but scrapes the walls of the conduit to prevent bridging and agglomerate formation. The solids pass through the second conduit with the gas that is introduced into the feed vessel. The flow of the carbonaceous solids from the feed vessel into the first conduit is normally controlled by a metering screw or similar device which mechanically transports the solids from the bottom of the feed vessel to the top of the first conduit. In a preferred embodiment of the invention, the first conduit extends downwardly from the feed vessel and the carbonaceous solids are passed through the conduit via gravity flow.

The process and apparatus of the invention provides a method for feeding carbonaceous solids which tend to agglomerate and/or swell to a high temperature reactor while avoiding bridging and plugging problems that may interrupt the continuous flow of the solids into the reactor. Furthermore, since the feeding is accomplished by dense phase pneumatic transfer, the amount of gas introduced into the reactor is very small compared to the case of dilute phase pneumatic transfer and the tendency of the gas to interfere with the reactions taking place within the reactor is substantially reduced.

BRIEF DESCRIPTION OF THE DRAWING

The drawing is a schematic diagram of a feed system in which carbonaceous solids are fed to a gasifier in accordance with the process and apparatus of the invention.

DESCRIPTION OF THE PREFERRED EMBODIMENTS

The feed system depicted in the drawing is designed to feed carbonaceous solids to a fluidized bed gasifier operated at an elevated temperature and pressure, and includes feed hopper 10 which communicates with the apparatus of this invention and with downwardly extending tube 12 via screw conveyor 14. Downwardly extending tube 12 communicates with horizontal tube 16, which in turn communicates with gasification reactor 18. Horizontal tube 16 contains a wire helix 30 which is rotated inside of the tube by constant or variable speed motor 20. The wire helix is situated inside of tube 16 such that when it rotates it continuously scrapes the inside walls of the tube.

Although the drawing depicts the use of a system for feeding carbonaceous solids to a pressurized gasifier, it will be understood that the process and apparatus of the invention is applicable to the feeding of carbonaceous solids to any processing vessel where the solids are subjected to elevated temperatures. Such vessel may include retorts, combustors, carbonizers, hydropyrolyzers, distillation columns, mixing vessels and the like. It will also be understood that the carbonaceous solids which the feed system operates on may be any solids containing organic matter which tend to agglomerate and/or swell when subjected to elevated temperatures. Such solids include coal, oil shale, tar sands, char, pyrolysis residues, petroleum coke, coal liquefaction residues, solid municipal wastes and the like.

Referring again to the drawing, the solid carbonaceous feed material is passed from a storage facility, not shown in the drawing, through line 11 into feed hopper 10. A gas such as air, nitrogen, carbon dioxide, and the like, preferably one similar to that generated in gasifier 18, is introduced into feed hopper 10 through line 22 and valve 24. The carbonaceous solids are transported from the bottom of the feed hopper through line 26 to the top of tube 12 via screw conveyor 14. The screw conveyor is operated by variable speed motor 28, which is set at a speed to deliver the carbonaceous solids at a predetermined rate from the feed hopper to the top of tube 12. This rate is determined by the desired feed rate for gasifier 18. It will be understood that although a screw conveyor is shown as transporting the carbonaceous solids from feed hopper 10 to tube 12, any mechanical transport device which can be controlled to transport carbonaceous solids at a predetermined rate may be used. Examples of such devices include star feeders, metering screws and the like.

The carbonaceous solids that enter the top of tube 12 pass down the tube under the influence of gravity into the front end of horizontal tube 16. Although tube 12 is shown in the drawing as extending directly downward from line 26, the tube may extend downward at any angle such that gravity will cause the solids to flow down the tube into tube 16. As the solids flow downwardly through tube 12, the gas introduced into feed vessel 10 through line 22 and valve 24 will also pass in relatively small amounts down the tube.

The carbonaceous solids exiting tube 12 into horizontal tube 16 are passed with the gas in dense phase pneumatic transport through tube 16 into gasifier 18. As the solids are being transported through the tube, wire helix 30 is continuously rotated by motor 20. This rotating wire is situated inside tube 16 in such a manner that it continuously scrapes the inside walls of the tube as it rotates and thereby effectively breaks up any particle bridges that may begin to form as the temperature of the carbonaceous solids increases due to the high temperature at which gasifier 18 is operated. As the carbonaceous solids are conveyed from the front end of the tube toward the gasifier, they will be subjected to gradually increasing temperatures. Because of this, the individual particles will swell, become sticky and tend to stick together forming bridges and agglomerates in the tube. Such bridging and agglomerate formation is prevented by the rotating wire helix. Normally, motor 20 is operated such that the wire helix rotates between about 10 and about 60 revolutions per minute. The rotating wire helix also serves to increase the resistance to flow so that the feed rate to the gasifier can be more easily controlled.

Although tube 16 is shown in the drawing to be a horizontal tube, it will be understood that the tube may be inclined upwardly or downwardly as it enters gasifier 18. It will also be understood that any device which serves to scrape the inside walls of tube 16 may be used in lieu of the wire helix shown in the drawing. For example, a perforated tube located concentrically inside of tube 16 such that it is flush with the inside walls of the tube could be moved foreward and backward so that the perforations serve to scrape the walls and thereby prevent the solids from bridging or agglomerating.

The driving force for the transfer of the carbonaceous solids through horizontal tube 16 into gasifier 18 is the pressure maintained in feed hopper 10 by the introduction of gas through lines 22 and valve 24. This pressure must be greater than the pressure in gasifier 18. In order to continuously control the amount of gas entering feed hopper 10 such that the pressure therein is always a predetermined amount greater than the pressure in gasifier 18, both the gasifier and feed hopper 10 are connected to differential pressure transmitter 32 via lines 36 and 34, respectively. The differential pressure transmitter is electrically connected to differential pressure regulating controller 38 such that the differential pressure measured by transmitter 32 can be compared to a predetermined differential pressure. The differential pressure regulating controller then sends a signal through line 40 to valve 24 to increase or decrease the flow of gas into feed hopper 10 in order to maintain the differential pressure measured by transmitter 32 approximately equivalent to the predetermined differential pressure. The pressure difference required between feed hopper 10 and gasifier 18 is normally dependent upon the length of horizontal tube 16 and the nature of the carbonaceous solids being fed from hopper 10 into gasifier 18.

It will be understood that wire helix 30 normally does not contribute to the transport of the solids through horizontal tube 16. The movement of the solids through the tube is maintained by creating a pressure in feed hopper 10 that is greater than the pressure in gasifier 18 and which overcomes the frictional forces between the solids particles and the walls of tube 16. When such a pressure is created, the solids are carried through tube 16 with the gas introduced into feed hopper 10 in dense phase pneumatic transport.

Although the process of the invention as described above and shown in the drawing is utilized to feed carbonaceous solids to a gasifier operated at an elevated temperature and pressure, it will be understood that the method can be utilized to feed such solids to any vessel which is operated at any temperature or pressure, including vessels operated under a vacuum. If the vessel to which the solids are being fed is operated under a vacuum, it may be necessary to operate the feed system in a vacuum also. If such is the case, however, the pressure in the feed system will be greater than the pressure in the vessel to which the solids are being fed.

It will be apparent from the foregoing, that the invention provides a process for feeding carbonaceous solids which tend to swell and agglomerate at elevated temperatures into a processing vessel operated at an elevated temperature without the formation of solid bridges or plugs in the feed lines to the vessel. As a result, the invention can be used to feed carbonaceous solids to gasifiers and other high temperature conversion vessels in a steady manner without interruptions due to such bridging and plugging.

I claim:

1. A process for feeding carbonaceous solids which tend to agglomerate and/or swell at elevated temperatures to a processing vessel which comprises:
   (a) passing said carbonaceous solids at a controlled rate from a feed vessel into a first conduit communicating with said feed vessel;
   (b) passing said carbonaceous solids through said first conduit into a second conduit communicating with said first conduit and with said processing vessel, said second conduit containing means for scraping the inside walls of said conduit; and
   (c) maintaining the pressure in said feed vessel at a value greater than the pressure in said processing vessel by introducing a sufficient amount of a gas into said feed vessel such that said carbonaceous solids pass in dense phase pneumatic flow through said second conduit into said processing vessel as said scraping means scrapes the inside walls of said second conduit.

2. A process as defined by claim 1 wherein said scraping means does not contribute to the movement of said carbonaceous solids through said second conduit.

3. A process as defined by claim 1 wherein said carbonaceous solids comprise coal.

4. A process as defined by claim 1 wherein said carbonaceous solids comprise oil shale.

5. A process as defined by claim 1 wherein said processing vessel comprises a hydropyrolysis reactor.

6. A process as defined by claim 1 wherein said processing vessel comprises a gasification reactor.

7. A process as defined by claim 1 wherein said processing vessel comprises a retort.

8. A process as defined by claim 1 wherein the rate at which said carbonaceous solids pass from said feed vessel into said first conduit is controlled by means of a screw conveyor.

9. A process as defined by claim 1 wherein said first conduit communicates with said second conduit at a 90° angle.

10. A process as defined by claim 1 wherein said first and second conduits comprise tubes.

11. A process as defined by claim 1 wherein said scraping means comprises a wire helix.

12. A process as defined by claim 1 wherein said gas introduced into said feed vessel comprises air, nitrogen, carbon dioxide, or the gas produced in said processing vessel.

13. A process as defined by claim 1 wherein said first conduit extends downwardly from said feed vessel and said carbonaceous solids are passed through said first conduit via gravity flow.

14. A process for feeding coal or oil shale solids which tend to agglomerate and/or swell at elevated temperatures to a processing vessel operated at an elevated temperature which comprises:
 (a) passing said coal or oil shale solids at a controlled rate from a feed vessel into a first tube communicating with and extending downwardly from said feed vessel;
 (b) allowing said coal or oil shale solids to pass down said first tube via gravity flow into a second tube communicating with said first tube and with said processing vessel, said second tube containing means for scraping the inside walls of said tube; and
 (c) maintaining the pressure in said feed vessel at a value greater than the pressure in said processing vessel by introducing a sufficient amount of a gas into said feed vessel such that said coal or oil shale solids pass in dense phase pneumatic flow through said second tube into said processing vessel as said scraping means scrapes the inside walls of said second tube.

* * * * *